(12) United States Patent
Haddad

(10) Patent No.: US 8,385,269 B2
(45) Date of Patent: Feb. 26, 2013

(54) ENABLING IPV6 MOBILITY WITH SENSING FEATURES FOR AD-HOC NETWORKS DERIVED FROM LONG TERM EVOLUTION NETWORKS

(75) Inventor: Wassim Haddad, San Jose, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 420 days.

(21) Appl. No.: 12/765,963

(22) Filed: Apr. 23, 2010

(65) Prior Publication Data
US 2011/0261753 A1    Oct. 27, 2011

(51) Int. Cl.
*H04W 4/00* (2009.01)

(52) U.S. Cl. .............. 370/328; 370/395.31; 370/465; 380/277

(58) Field of Classification Search .......... None
See application file for complete search history.

(56) References Cited

U.S. PATENT DOCUMENTS

| 7,881,463 | B1* | 2/2011 | Sodersjerna et al. | 379/413.03 |
| 2003/0208562 | A1* | 11/2003 | Hauck et al. | 709/219 |
| 2004/0008845 | A1 | 1/2004 | Le Franck et al. | |
| 2005/0010754 | A1* | 1/2005 | Brendel | 713/153 |
| 2007/0109982 | A1* | 5/2007 | Gudipudi et al. | 370/310.2 |
| 2007/0283141 | A1* | 12/2007 | Pollutro et al. | 713/155 |
| 2009/0254668 | A1* | 10/2009 | Jean | 709/228 |
| 2009/0323659 | A1* | 12/2009 | Zhang | 370/338 |
| 2010/0093364 | A1* | 4/2010 | Ribeiro et al. | 455/452.2 |
| 2011/0188379 | A1* | 8/2011 | Calippe et al. | 370/241.1 |

FOREIGN PATENT DOCUMENTS

GB    2411086 A    8/2005

* cited by examiner

*Primary Examiner* — Andrew Chriss
*Assistant Examiner* — Salvador E Rivas
(74) *Attorney, Agent, or Firm* — Roger S. Burleigh

(57) ABSTRACT

A wireless communication device includes a plurality of different wireless interfaces to facilitate communications with a remote device over a corresponding plurality of networks. The device can switch between the different interfaces to migrate an on-going communications session from one that requires the infrastructure of a fixed wireless communication network to one that does not require the infrastructure of a fixed wireless communication network. Switching between the various interfaces allows the migration to occur while protecting the device against malicious third-party impersonation attacks.

30 Claims, 10 Drawing Sheets

US 8,385,269 B2

ENABLING IPV6 MOBILITY WITH SENSING FEATURES FOR AD-HOC NETWORKS DERIVED FROM LONG TERM EVOLUTION NETWORKS

BACKGROUND

The present invention relates generally to wireless communications devices, and particularly to wireless communication devices capable of communicating with a remote device in both a peer-to-peer mode and across a cellular communications network.

Wireless communication networks have been an integral part of society for many years. Mobile terminals, such as cellular telephones, for example, generally use such networks to communicate voice and data with remote devices. Over time, wireless networks have evolved to facilitate the communication of a variety of different types of data at ever-increasing bit-rates to meet consumer demand for faster, better services. However, for a variety of different reasons, wireless networks typically have not been able to provide the same type of experience to users as a fixed wireline network is able to provide. The latest solution, referred to as "Long Term Evolution" (LTE), promises to change that. With LTE networks, wireless users will have the ability to use applications typically reserved for use on wireline networks, such as the Internet. Such applications include, but are not limited to, Voice over IP (VoIP) and streaming video and music.

In addition to communicating over these fixed wireless networks, suitably-equipped mobile terminals can also communicate directly via a short-range communication interface. With short-range interfaces, such as BLUETOOTH, for example, mobile terminals detect one another when they come within close proximity to each other. Once detected, the mobile terminals can establish a communications channel between them to share data over short distances. Generally, BLUETOOTH-type connections are unplanned and occur when two or more devices detect each other. Additionally, the connections break down once two connected devices travel away from each other beyond the distance required to communicate over the short-range interface, which is usually a few tens of meters. Thus, such short-range connections are usually referred to as "ad-hoc" connections.

SUMMARY

The present invention provides a wireless communication device that switches between different wireless interfaces to migrate an on-going communications session with a remote device from one that requires the infrastructure of a fixed wireless network to one that does not require such an infrastructure. Further, the wireless communication device performs the migration while protecting against malicious hijacking attacks.

In one embodiment, the wireless communication device is configured to communicate with a remote device via one or more communication interfaces. To accomplish this, an exemplary wireless communication device may comprise one or more cellular transceivers configured to communicate with a remote device via a first wireless interface associated with a first wireless communications network, such as a Wireless Local Area Network (WLAN), for example, and a Long Term Evolution (LTE) interface associated with an LTE network. The wireless communication device also comprises a short-range transceiver to communicate with the remote device in a direct, peer-to-peer mode over an ad-hoc short-range communication link, and a controller.

The short-range transceiver, which may be a BLUETOOTH transceiver, for example, is configured to detect the remote device when the remote device is proximate the wireless communication device. Upon detecting the remote device, the controller generates a signaling request message for the remote device. The signaling request message comprises a request to the remote device establish an ad-hoc peer-to-peer communication link with the wireless communication device, and to move the current communication session to the ad-hoc link. To protect against malicious impersonation attacks, the controller generates the signaling request message to include one or more security parameters. These parameters, which may include, but are not limited to, one or more generated cookies, session identifiers, nonces, nonce indices, and keys, authenticate the wireless communication device to the remote device. Once generated, the controller transmits the signaling request message to the remote device via the LTE interface. If the remote device agrees, the wireless communication device will receive a signaling accept message from the remote device. The wireless communication device can then establish the ad-hoc short-range communication link with the remote device and migrate the on-going communication session to the newly established short-range communications link.

In another embodiment, the wireless communication device is configured to receive a signaling request message requesting the establishment of the ad-hoc link from the remote device via the LTE interface. In these embodiments, the controller will validate the signaling request message to ensure that the remote device sent the message instead of a third-party malicious imposter. If valid, the controller generates a signaling response message and sends the message back to the remote device via the LTE interface.

In one embodiment, the signaling response message comprises either a signaling accept message or a signaling deny message. The signaling accept message will allow the establishment of the ad-hoc short-range communication link with the remote device, and the migration of the current communication session to the newly established ad-hoc link. The signaling deny message will block the establishment of the ad-hoc link and maintain the current communication session on the current link. Regardless of the type of signaling response message that is generated, however, the controller at the wireless communication device includes one or more security parameters in the response message to authenticate the wireless communication device to the remote device.

DETAILED DESCRIPTION

Figure 1:
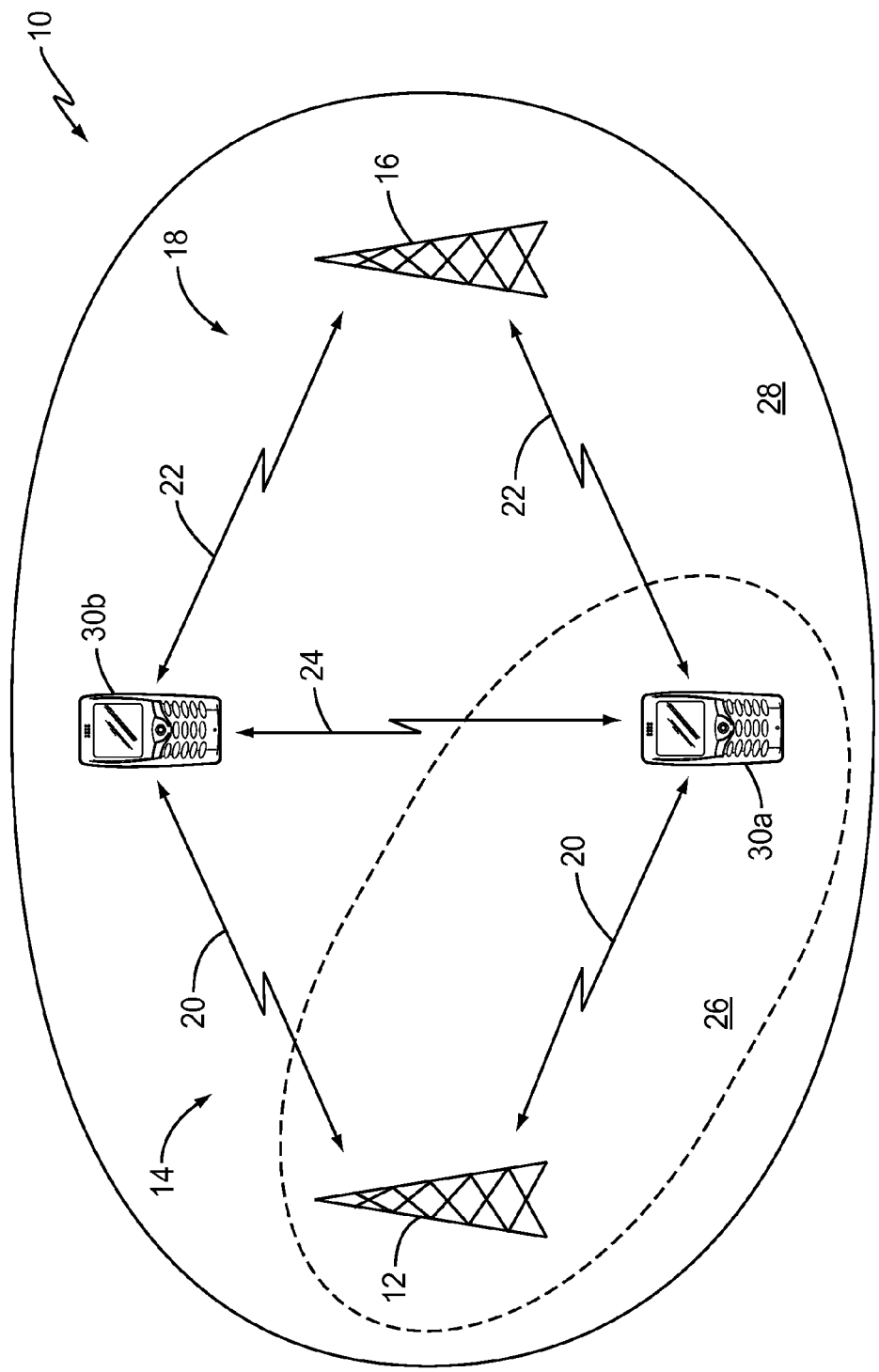
FIG. 1 is a block diagram illustrating some of the components of a communication system suitable for use in one embodiment of the present invention.

The present invention provides a wireless communication device, such as a mobile terminal, for example, that is equipped to communicate over a plurality of different wireless interfaces. As described in more detail below, mobile terminals configured according to the present invention can switch between a plurality of different communications interfaces to migrate an on-going communications session from one that requires the infrastructure of a fixed wireless communication network to one that does not (e.g., an ad-hoc peer-to-peer communications link established between two mobile terminals). To effect the switch between interfaces, the mobile terminals exchange signaling and mobility messages over the different communication interfaces. This allows the migration to occur while protecting the mobile terminals against malicious third-party impersonation attacks.

The wireless communication interfaces may be any wireless interfaces known in the art. However, in one embodiment, one of the wireless communication interfaces is a Long Term Evolution (LTE) interface that allows the mobile terminals to communicate data via an access node in an LTE network. Another of the wireless communication interfaces may be, for example, a Wireless Local Area Network (WLAN) interface or a Digital Subscriber Line (DSL) interface that facilitate packet data communications over a fixed network. Another wireless communication interface may be a short-range interface, such as a BLUETOOTH interface, for example, that allows the mobile terminals to directly communicate with each other in a peer-to-peer mode (i.e., without communicating over a fixed wireless network infrastructure). As those skilled in the art will readily appreciate, other interfaces may used in addition to, or in lieu of, those interfaces specifically mentioned.

According to the present invention, mobile terminals and other communication nodes can use the infrastructure of an LTE network to establish an ad-hoc "social ecosystem." As used herein, a "social ecosystem" is one or more communication nodes that are associated with different proximity services and/or personal presence notifications. These nodes include short-range communication transceivers, and thus, are able to establish ad-hoc, short-range communications links with mobile terminals configured according to the present invention. For example, the nodes in a "social ecosystem" may comprise short-range transceivers that broadcast public and/or private transportation schedules, restaurants menus, environmental data, commercial offers, safety announcements, or other individual actions/requests such as requests to play or join a game. These nodes may also comprise mobile terminals that transmit or advertise personal presence notifications to allow other mobile terminals to detect them when they travel in close proximity to one another. Regardless of the information or signals such nodes provide, mobile terminals configured according to the present invention can use the infrastructure provided by an LTE network to establish a short-range communication link with these nodes so that they can communicate directly over the short-range communication link.

Turning now to the drawings, FIG. 1 illustrates a communication system 10 suitable for use in one embodiment of the present invention. As seen in FIG. 1, system 10 comprises an access node 12 for a WLAN network 14 and an access point 16 for an LTE network 18. Mobile terminals 30a, 30b (collectively referred to herein as mobile terminals 30) that are configured according to the present invention can communicate with each other utilizing the infrastructure of either network 14, 18 via a WLAN interface 20, or an LTE interface 22, respectively. Additionally, each mobile terminal 30 is capable of detecting the other mobile terminal 30 as being part of their "social ecosystem." Therefore, the mobile terminals are equipped with short-range transceivers to communicate with each other over a short-range communication interface 24, such as BLUETOOTH, for example.

The operation of the access node 12 in WLAN 14 is well-known in the art; however, a brief description is included herein for clarity. For more information on WLANs and the associated interfaces, the interested reader is directed to the document entitled, "IEEE Std 802.11-2007," which was published on Jun. 12, 2007, and is incorporated herein by reference in its entirety.

Access node 12 is a wireless node that provides the mobile terminals 30 with a connection to the Internet. Each mobile terminal 30a, 30b communicates signaling messages to and from the access node 12 via a WLAN air interface 20 so that the mobile terminals 30 can communicate data packets with each other across the WLAN 14. Typically, the access point 12 in the WLAN 14 allows a mobile terminal 30 to move around within a predefined local coverage area 26 without losing the connection to the access point 12. According to one embodiment of the present invention, mobile terminals 30a, 30b exchange signaling and/or mobility messages across the WLAN 14 to establish a short-range communication link between them.

Access point 16 in LTE network 18 is also a wireless node that provides the mobile terminals 30 with communications and a connection to the Internet over a predefined coverage area or cell 28. The mobile terminals 30 may send and receive signaling and mobility messages to and from the access point 16 via an LTE air interface 22 to facilitate sending and receiving data packets with each other over the LTE network 18. The LTE network 18 typically comprises a plurality of entities referred to as eNodeBs arranged in a "flat" architecture. Although not specifically shown, the eNodeBs are interconnected via an X2 interface. Further, LTE networks 18 do not usually have a centralized controller and thus, the eNodeBs connect to an Evolved Packet Core network via an S1 interface.

In addition to the wireless air interfaces 20, 22 that allow the mobile terminals 30 to communicate to the corresponding WLAN 14 and LTE network 18, the mobile terminals 30 may also communicate directly with one another in a peer-to-peer mode over short distances via an short-range wireless interface 24, such as a BLUETOOTH interface, for example. With such interfaces, mobile terminal 30 can detect other BLUETOOTH enabled devices as those devices come within close proximity of the mobile terminal 30.

Conventionally, devices that are equipped to communicate over a short-range wireless interface negotiate directly with each other to establish an ad-hoc communication link. Once established, the devices can communicate with one another using an appropriate short-range protocol. The present invention, however, leverages the LTE network 18 and the WLAN network 14 to establish such ad-hoc short-range communication links and to move an existing communication session from the fixed wireless network to the ad-hoc short-range communication link. More specifically, the mobile terminals 30 utilize the strong authentication and authorization procedures implemented by networks 14, 18 to establish the ad-hoc, short-range communication link with other devices that are part of the mobile terminal's "social ecosystem," and then move their communication session to the short-range link to communicate. The present invention also utilizes the infrastructure of these networks to enhance security and prevent malicious impersonation attacks while establishing the short-range communication links.

Figure 2:
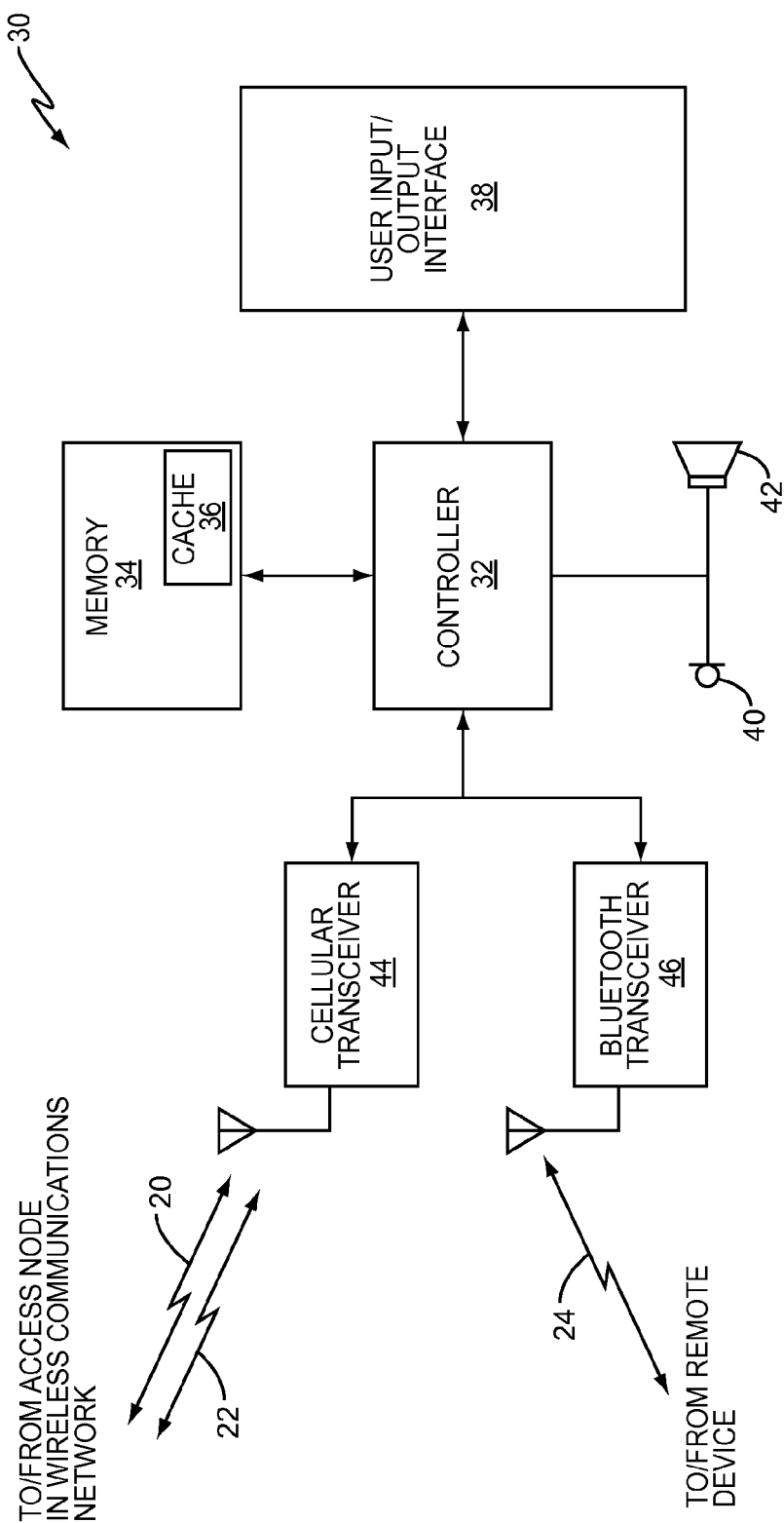
FIG. 2 is a block diagram illustrating some of the component parts of a mobile terminal configured to operate in the communication system of FIG. 1 according to one embodiment of the present invention.

FIG. 2 is a block diagram illustrating some of the main functional components of an exemplary mobile terminal 30 configured according to one embodiment of the present invention. Mobile terminal 30 comprises a controller 32, a memory 34 having a cache 36, a user input/output interface 38, a microphone 40, a speaker 42, a cellular transceiver 44, and a short-range transceiver 46.

The controller 32 comprises one or more microprocessors, microcontrollers, hardware, or a combination thereof. Controller 32 executes programs and applications stored in memory 34, processes signals transmitted and received by the cellular transceiver 44 and the short-range transceiver 46, and generally controls the overall operation of the mobile terminal 30. According to one embodiment of the present invention, the controller 32 switches between communicating over wireless interfaces 20, 22, and 24, and generates one or more signaling and/or mobility messages to transmit over those interfaces.

Memory 34 comprises one or more devices designed to store programs and data needed for operation of mobile terminal 30 on either a temporary or permanent, or semi-permanent basis. Exemplary memory devices may include, for example volatile memory (e.g., RAM) and/or nonvolatile memory (ROM, EEPROM, Flash). As seen in FIG. 2, memory 34 comprises a predefined area called a cache 36. As described in more detail herein, the controller 32 may generate information that binds selected source addresses at the mobile terminal 30 to selected destination addresses located at a remote communications device and store those bindings in the cache 34.

User input/output (I/O) interface 38 includes input and output devices that enable a user to interact with and control the mobile terminal 30. Although not specifically shown, the user I/O interface 38 may include a display to output information for viewing by the user and one or more input devices such as keypads, dials, wheels, function keys, and touch pads. Some mobile terminals 30 may include a touch screen display that also functions as an input device. Mobile terminal 30 will typically also include a microphone 40 to convert audible sounds into audio signals for input to the controller 32, and one or more speakers 42 to convert audio signals output by the controller 32 into audible sounds that can be heard by the user.

Cellular transceiver 44 comprises one or more fully functional cellular transceivers that enable the mobile terminal 30 to communicate over a variety of different cellular networks such as Wideband Code Division Multiple Access (WCDMA) networks, Long Term Evolution (LTE) networks, WLAN networks, and WiMAX networks. Short-range radio transceiver 46 includes any type of short-range radio transceiver, such as a BLUETOOTH transceiver, that enables the mobile terminal to communicate with one or more nearby devices in the mobile terminal's "social ecosystem."

As stated above, a mobile terminal configured according to the present invention can build a social ecosystem using the infrastructure of the LTE network 18, and establish short-range communication links with any of the devices in the social ecosystem. Within this social ecosystem, a mobile terminal 30, which is equipped to communicate over an LTE network 18, can sense its environment to detect a variety of different types of devices. Once detected, the mobile terminal 30 can establish a short-range communication link with the remote device and migrate a current communication session from an infrastructure-based network, such as the WLAN or LTE networks 14, 18, to the newly established short-range link.

More specifically, the present invention leverages the strong authentication and authorization procedures implemented by the infrastructure of the LTE network 18 to build its social ecosystem. Since these procedures allow a mobile terminal to safely connect to an LTE infrastructure, it also would allow that same mobile terminal to safely become part of another mobile terminal's social ecosystem. Thus, once authenticated, an LTE-enabled mobile terminal should be able to seamlessly switch from communicating with a remote mobile terminal (or other remote device) via the infrastructure of LTE network 18 (or WLAN 14) to communicating with the remote mobile terminal over a short-range communication link.

To accomplish this, the present invention provides a signaling and mobility mechanism that allows mobile terminals and other devices to switch their data traffic from a communication link provided by a network infrastructure, such as the WLAN 14 or the LTE network 18, to a direct ad-hoc short-range communications link after sensing each other's presence. Further, when the short-range communications link degrades or becomes unusable, the signaling and mobility mechanism allows the mobile terminal and other devices to switch back to the previous network-based communication link, or create a new LTE network-based communications link.

In more detail, the present invention uses the LTE network 18 to function as a "virtual home network." Specifically, each device configured according to the present invention has an LTE interface that is always "on" whenever the device's ad-hoc interface is active. The LTE network 18 will enable communicating mobile terminals 30 to relay mobility signaling messages to each other's claimed addresses, and to test each other's reachability on those addresses. However, there is a serious threat whereby a malicious LTE-enabled node may attempt to hijack an on-going communication session between the two mobile terminals 30. With such attacks, the malicious node detects an IP address used by a first mobile terminal on a wireless interface, such as a WLAN interface 20, and then impersonates the first mobile terminal to a second mobile terminal and suggests that second mobile terminal move the on-going communication session to an ad-hoc short-range interface. The malicious node would claim the first mobile terminal's IP address and bind it to its own ad-hoc interface IP address, thereby allowing the malicious node to pose as the first mobile terminal and receive information and data meant for the first mobile terminal. Absent an appropriate reachability mechanism to validate the identity of the first mobile terminal, such as provided by embodiments of the present invention, the second mobile terminal might switch its data traffic to the ad-hoc interface and unknowingly communicate data meant for the first mobile terminal to the malicious node.

Figure 3A:
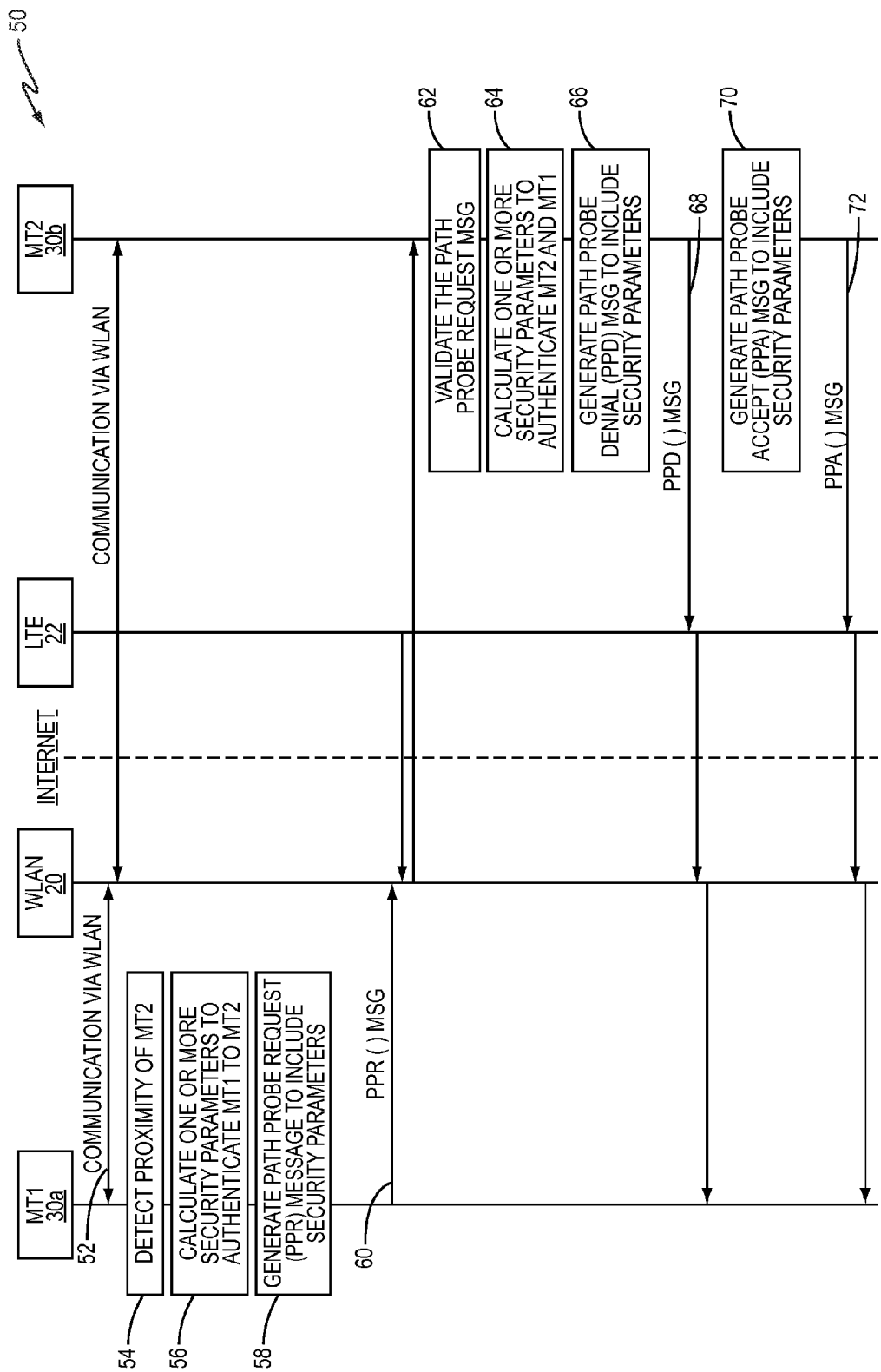
FIGS. 3A-3C are signal diagrams illustrating a method by which communicating mobile terminals can switch between multiple communications interfaces according to one embodiment of the present invention.
Figure 3B:
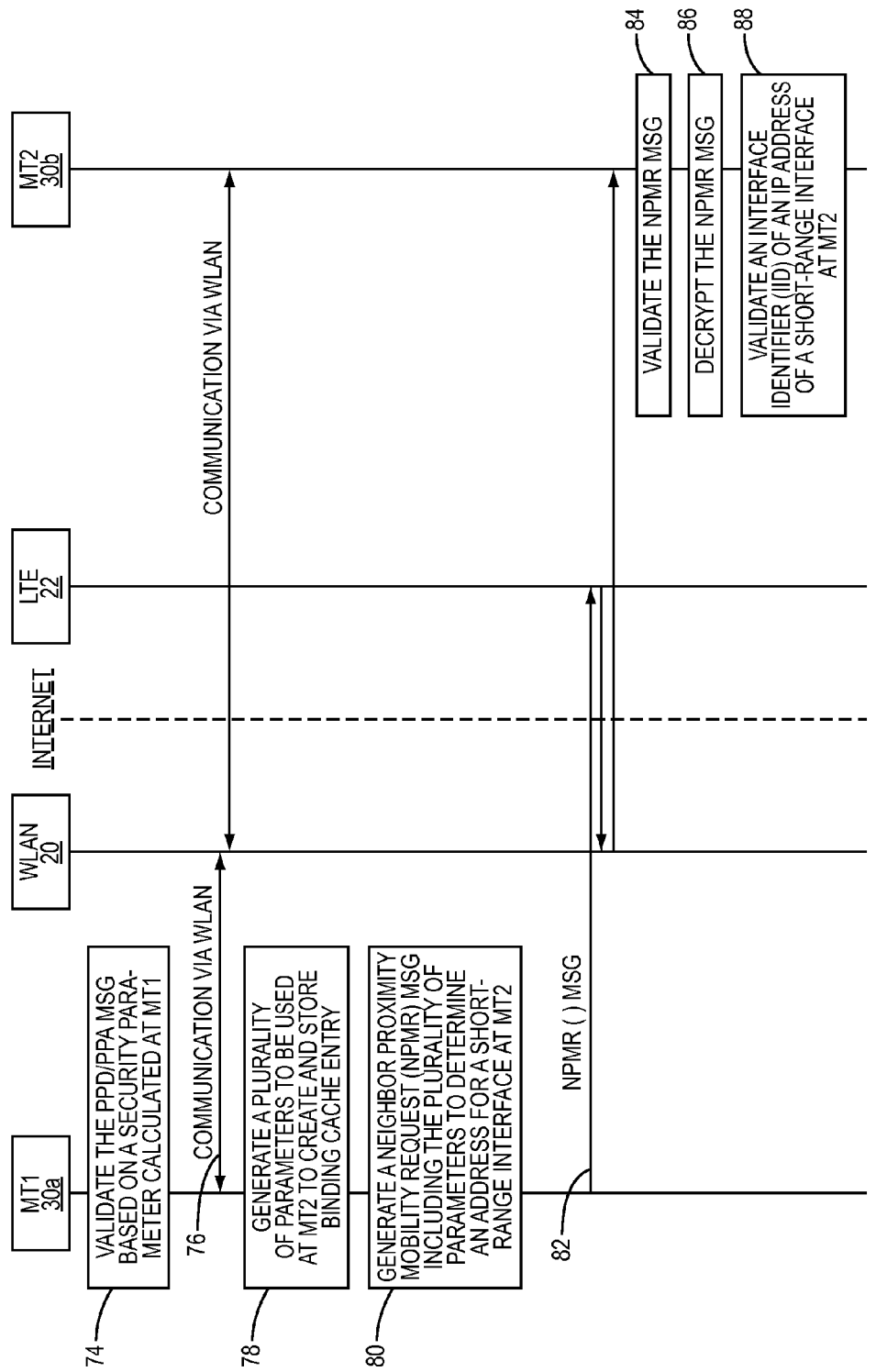
Figure 3C:
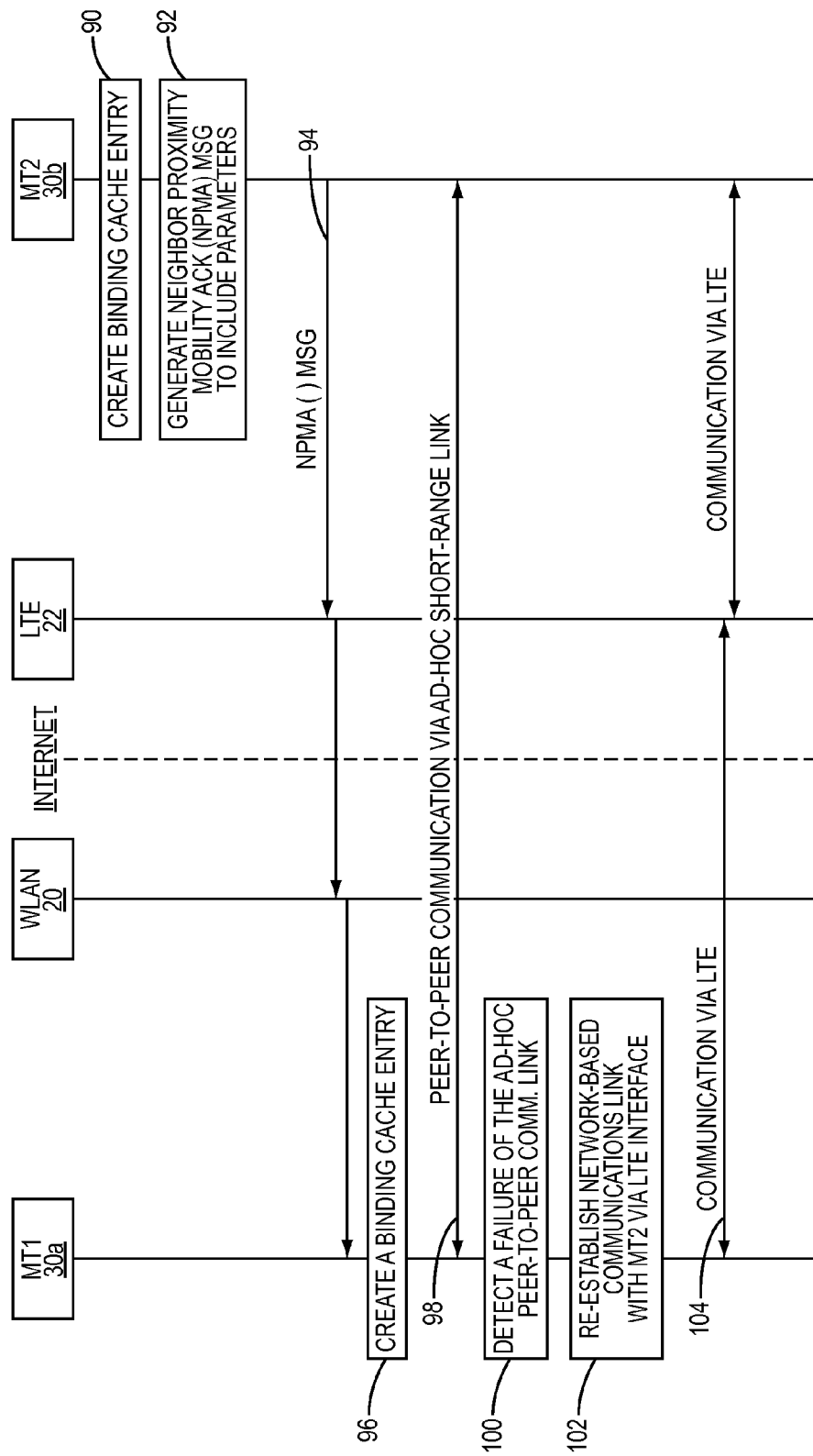

FIGS. 3A-3C are flow diagrams illustrating a method 50 of switching between communication interfaces according to one embodiment of the present invention in a manner so as to prohibit such malicious attacks. Method 50 imposes the strong security requirements already implemented in the LTE network 18 to prevent a malicious node from hijacking targeted communication sessions between two mobile terminals. In FIGS. 3A-3C, the two mobile terminals are labeled MT1 and MT2, and are configured according to the previously described mobile terminals 30a, 30b. MT1 is considered an initiator node because it initiates the communication session. Further, it is assumed that each of the mobile terminals MT1, MT2 are capable of communicating over any of at least three different interfaces—the WLAN wireless interface 20, the LTE wireless interface 22, and the ad-hoc short-range wireless interface 24—and that each interface has its own, pre-configured IPv6 address.

Method 50 begins with mobile terminal MT1 communicating data packets with MT2 over an established WLAN communication link via access node 12 (line 52). It should be noted that both MT1 and MT2 have an LTE interface that are turned "on." Further, both MT1 and MT2 have short-range transceivers to allow the two mobile terminals to detect each other when they come within close geographical proximity of each other.

Upon detecting the proximity of MT2 (box 54), MT1 may decide to request that MT2 move the on-going WLAN-based communication session from the WLAN network 14 to an ad-hoc short-range communication link. The controller 32 in MT1 may, for example, decide to request the move to the short-range link based on any of a variety of different parameters known in the art including, but not limited to, battery power, signal strength, type of application used/flow of traffic, and usage tariff. If the controller 32 of MT1 decides not to move communications to a short-range link, MT1 and MT2 would simply continue their communications via the WLAN network 14. However, if controller 32 does decide to move the on-going WLAN communication session to a short-range link, controller 32 in MT1 will establish the short-range link with MT2 and move the on-going fixed-network based communication session to the newly established short-range link.

To avoid eavesdropping attempts, MT1 will securely transfer the on-going communications session to the short-range link. More particularly, a Man-in-the-Middle (MiTM) (i.e., a malicious node) may attempt to eavesdrop on the communications link between MT1 and MT2 (i.e., on the path between their WLANs interfaces). Such eavesdropping activities could lead to malicious attempts at hijacking the communication session. Therefore, to provide a secure transfer of communications, MT1 calculates one or more security parameters to authenticate itself to MT2 (box 56), and then generates a new signaling message, the Path Probe Request (PPR) message, to include the calculated security parameters (box 58). The security parameters will assist MT2 in validating that the generated PPR message originated from the actual MT1 (as opposed to an imposter), as well as in processing additional messages.

Figure 4:
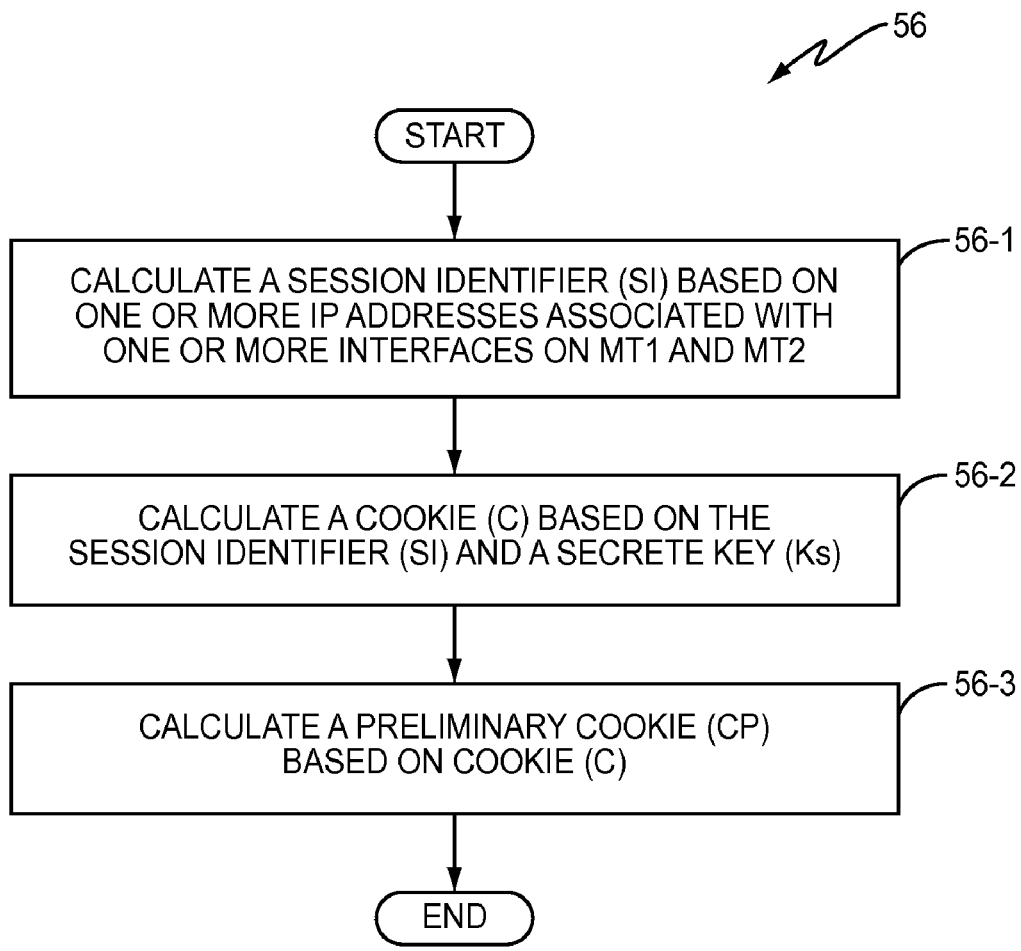
FIG. 4 is a flow chart illustrating a method for calculating security parameters for inclusion in a signaling message according to one embodiment of the present invention.

The security parameters calculated by MT1 may be any parameters needed or desired, but in one embodiment, illustrated in FIG. 4, the security parameters include a Session Identifier (SI), and a Cookie (C). The controller 32 may also calculate a third parameter—a "Preliminary Cookie" (CP)—for use in a later message.

The SI may be obtained in any manner known in the art; however, in one embodiment, the controller 32 calculates the SI based on one or more IP addresses associated with one or more interfaces on MT1 and MT2 (box 56-1). For example, the controller 32 may calculate the SI as:

$$SI = First[64, Hash(MT1(W)|MT2(W)|MT1_{SP}(L)|MT2_{DP}(W)].$$

In this embodiment, the controller 32 hashes the IPv6 addresses of the WLAN interfaces for both MT1 and MT2 (i.e., MT1(W) and MT2(W)), as well as the IPv6 address of the source port on MT1 (i.e., $MT1_{SP}(L)$), and the IPv6 address of the destination port on MT2 (i.e., $MT2_{DP}(W)$). As seen in FIG. 3A, the PPR message is sent by MT1 over its LTE interface 22 and received by MT2 over its WLAN interface 20. Thus, the source and destination ports reflect the IP addresses of the LTE interface 22 and the WLAN interface 20, respectively. It should be noted that the LTE and WLAN interfaces can communicate with each other via a common core network (i.e., the Internet), and thus, messages can be communicated between devices over different interfaces. Once hashed, the controller 32 takes the first 64 bits of the resultant hash for use as the SI.

The Cookie (C) may also be obtained in any manner known in the art; however, in one embodiment, the controller calculates the Cookie (C) based on the calculated SI and a secret key ($K_s$) known only to MT1 (box 56-2). For example, the controller may calculate C as:

$$C = First[64, Hash^2(SI|K_s)].$$

Particularly, the controller 32 hashes the computed SI and the secret key (Ks), and then once again hashes that result. Once the double-hash operation is complete, the controller 32 takes the first 64 bits of the resultant value and uses those bits as the Cookie (C).

The controller 32 then generates the Preliminary Cookie (CP), which is not used in the PPR message, but may be used as a security parameter in a later signaling message (box 56-3). In use, MT1 will send the CP parameter to MT2 in a signaling message after sending the Cookie (C) so that MT2 can be certain that MT1 sent both the C and CP parameters. In this embodiment, the security parameter CP is generated based on the calculated Cookie (C). For example, the controller 32 may generate CP as:

$$CP = First[64, Hash(SI|Ks)].$$

Thus, while generating the Cookie (C), the controller 32 can simply take the first 64 bits of the first resultant hash and assign that value to the CP parameter before performing the second hash operation.

It should be noted that, to prevent against malicious attacks, the signaling messages generated by MT1 (as well as those generated by MT2, which will be seen later in more detail), are intentionally communicated using as many available communication paths as possible. Thus, as seen in FIG. 3A, MT1 transmits the generated PPR message including its calculated security parameters over its LTE interface 22 to MT2 (box 60), and MT2 receives the PPR message over its WLAN interface 20. This is possible because a back-end communication network, such as the Internet, for example, interconnects the WLAN network 14 and the LTE network 18.

Upon receiving the PPR message from MT1, the controller 32 at MT2 will validate the message to be sure that a malicious node is not impersonating MT1 (box 62). In the following description, and as seen in the figures, the validity of numerous parameters are checked without explicit flow control or a detailed explanation. However, those of ordinary skill in the art will readily appreciate that any of a variety of known methods of checking the parameters is suitable for checking the validity of the message, and that any failed validity check would simply terminate the procedure.

Figure 5:
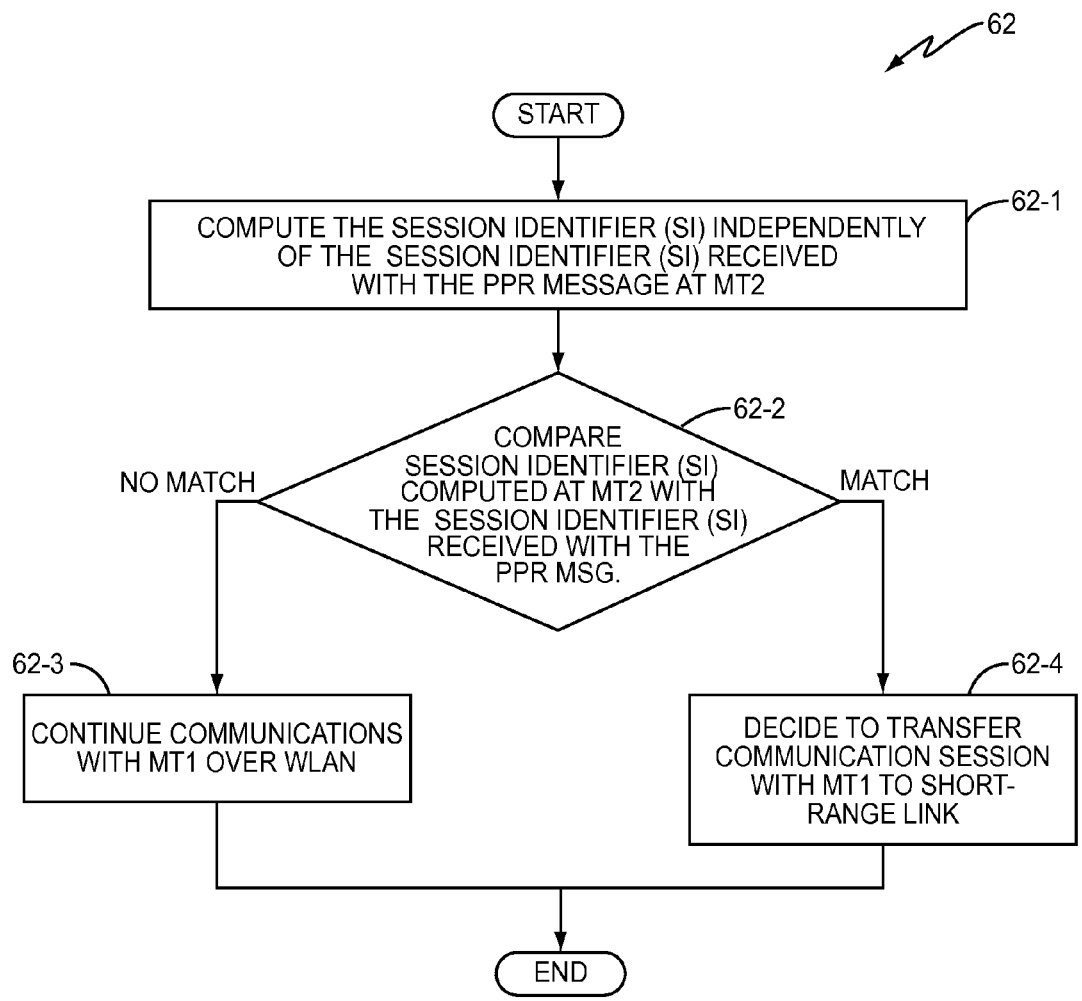
FIG. 5 is a flow chart illustrating a method for validating security parameters received with a signaling message according to one embodiment of the present invention.

For example, in one embodiment seen in FIG. 5, MT2 checks the validity of the received PPR message by independently computing the SI at MT2 (box 62-1) and then comparing its computed SI against the SI received with the PPR message (box 62-2). If the two do not match, validation would end and communications between MT1 and MT2 would resume over the WLAN network 14 (box 62-3). If the two values do match, MT2 could decide to transfer the communication session to an ad-hoc short-range communications link as requested by MT1 (box 62-4). As above, the decision on whether to transfer to the short-range link may be based on one or more factors that include, but are not limited to, the amount of remaining battery power, a relative cost difference between using one link over another, and the quality of the current link.

As seen in FIG. 3A, MT2 will calculate its own set of security parameters to authenticate itself to MT1 to be included in a response message that is sent to MT1 (box 64). Particularly, if MT2 decides not to grant the request to move to a short-range link, MT2 will generate a Path Probe Deny (PPD) message to include the calculated security parameters (box 66) and transmit the PPD message to MT1 (line 68). Otherwise, the controller 32 of MT2 will generate a Path Probe Accept (PPA) message to include the calculated security parameters (box 70), and transmit the PPA message to MT1 (line 72). After transmitting the PPA message, the mobile terminal will remain "stateless," which is a state that allows the mobile terminal to generate its own link local addresses using locally available information and data.

Figure 6:
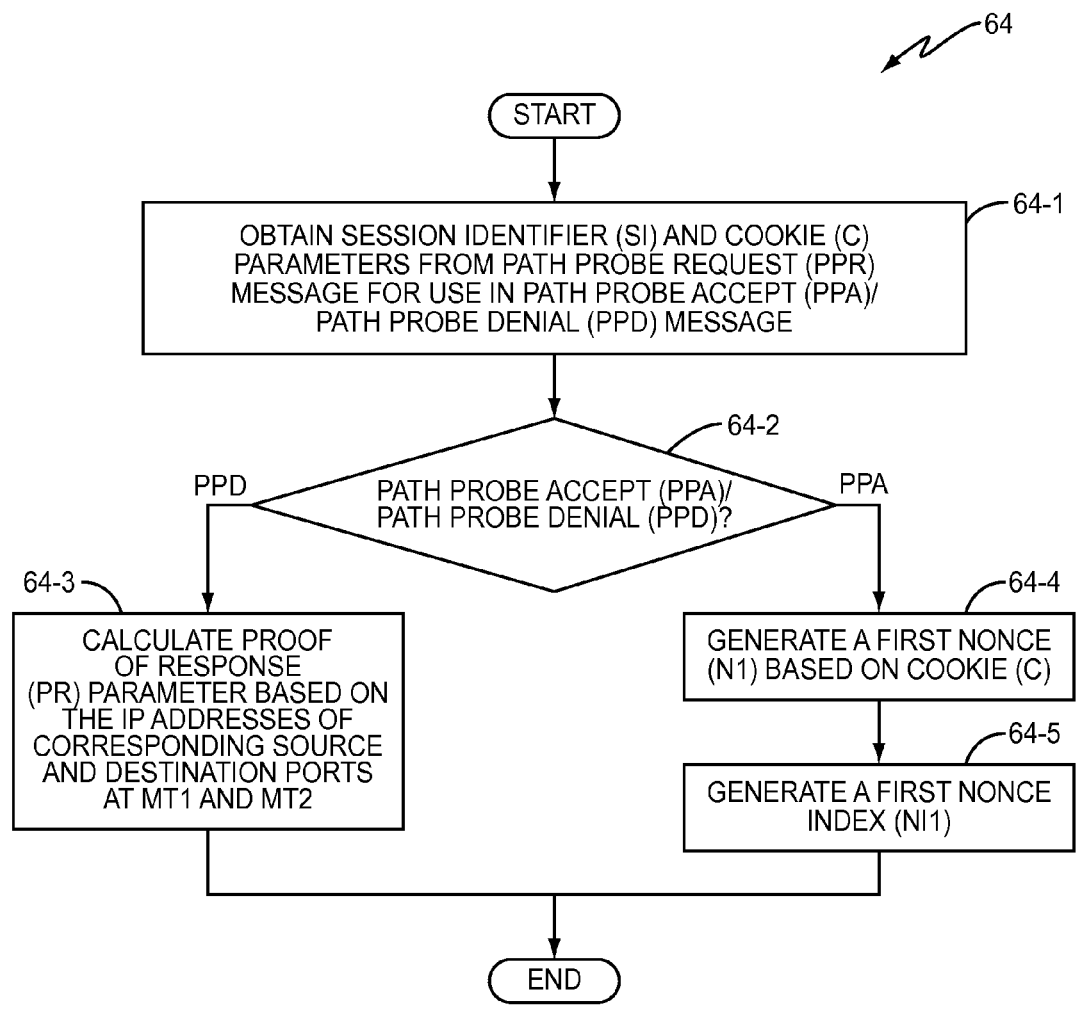
FIG. 6 is a flow chart illustrating a method for calculating security parameters for inclusion in a signaling response message according to one embodiment of the present invention.

The security parameters for the PPD and PPA messages may be any parameters or values known in the art; however, MT2 will generate a different set of parameters depending on whether it sends a PPD message to block the transfer of communications, or a PPA message to grant the request to transfer communications. For the PPD message, as seen in FIG. 6, the controller 32 in MT2 simply re-uses the SI and C parameters received with the PPR message for both the PPA message and the PPD message (box 64-1). Then, for a PPD message (box 64-2), MT2 will generate a new parameter "PR" (box 64-3). The PR parameter will force any malicious node that might be attempting to hijack communications to be on two different communications paths and may be computed as follows.

$$PR=First[64,Hash(MT2_{SP}(L)|MT1_{DP}(W)|MT1(W)|MT2(W)].$$

For the PPA message (box 64-2), MT2 will generate a first nonce (N1) based on the Cookie (C) and from parameters and values stored at MT2 (box 64-4), as well as a first nonce index (NI1) (box 64-5). MT2 then sends the PPA or PPD message from its LTE interface, and thus, carries the IPv6 address of its LTE interface as the source port ($MT2_{SP}(L)$) and the IPv6 address of the WLAN interface of MT1 as its destination port ($MT1_{DP}(W)$).

Upon receiving a response message sent by MT2 (i.e., the PPD message or the PPA message), MT1 will validate the response message based on at least one of the security parameters previously calculated at MT1 (FIG. 3B—box 74). The security parameter(s) used to determine validity may be any parameters desired. However, in one embodiment, a valid PPD or PPA response message will contain the SI parameter originally generated and sent by MT1 in the original PPR message. Thus, to determine the validity of an incoming PPA or PPD message, MT1 needs only to check the value of the SI received with the incoming PPA or PPD message against the value of SI it generated as part of the PPR message.

Once in receipt of a valid PPD message, MT1 could simply continue to communicate with MT2 via the existing WLAN interface 20 (line 76). After receiving a valid PPA message, however, MT1 could switch from the WLAN interface 20 to the short-range interface 24 to communicate with MT2 via the established short-range communications link. Therefore, MT1 could bind the IPv6 addresses for the interfaces at MT1 and MT2 and switch to communicate with MT2 over the short-range interface 24 (box 94). In some cases, however, MT1 may not be aware of the IPv6 addresses for the short-range interface of MT2 (and vice versa). In these cases, MT1 will generate a plurality of parameters to be used at MT2 to create and store a binding cache entry (box 78), and generate a new mobility message, a Neighbor Presence Mobility Request (NPMR) message, to include the generated parameters (box 80). As seen in more detail later, the NPMR message triggers a response message from MT2 that identifies the ad-hoc interface at MT2. Once generated, MT1 will encrypt and authenticate the NPMR message and transmit the NPMR message to MT2 (line 82).

Figure 7:
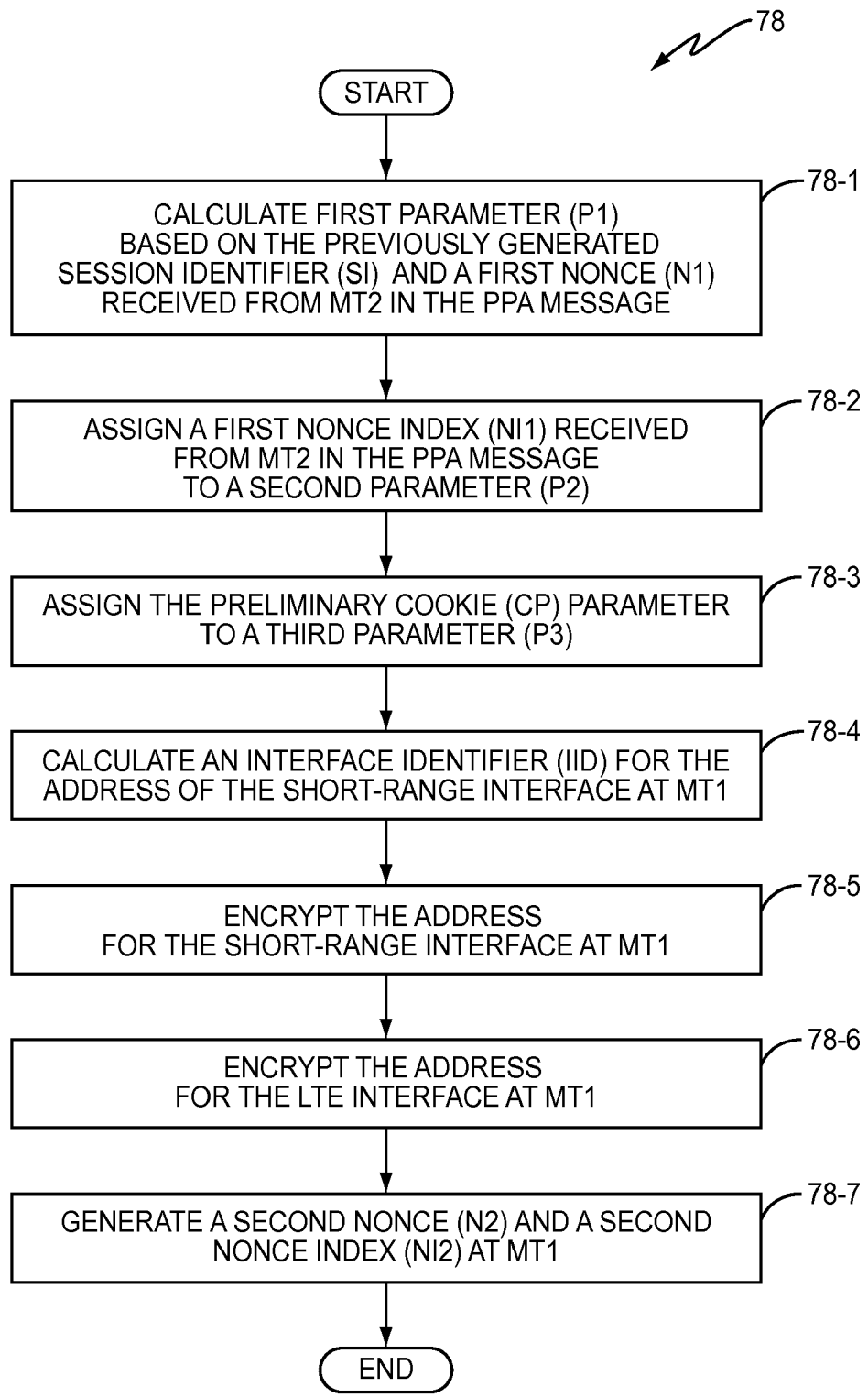
FIG. 7 is a flow chart illustrating a method for calculating parameters at one wireless communication device that are used to create a binding cache entry at the remote wireless communication device according to one embodiment of the present invention.

The plurality of parameters generated by MT1 for the NPMR message may be any parameters needed or desired. In one embodiment, illustrated in FIG. 7, MT1 generates or obtains parameters P1, P2, P3, N1, NI1, N2, NI2, IID, and CP. Particularly, the controller 32 in MT1 hashes the previously generated SI and the nonce N1 received with the PPA message, and then takes the first 64 bits of the value for parameter P1 (box 78-1).

$$P1=First[64,Hash(SI|N1)].$$

The controller 32 then assigns the nonce index (NI1) received in the PPA message to a second parameter P2 (box 78-2), and assigns the previously generated parameter CP to a third parameter P3 (box 78-3). The controller 32 then calculates an Interface Identifier (IID) for the address of the short-range interface at MT1 (box 78-4). For example, in one embodiment, the IPv6 addresses for both the source and destination ports at each of MT1 and MT2 are configured using the link local prefix, and their interface identifiers set to zero. This allows MT1 to compute the interface identifier using a crypto-generated address (CGA) technique; however, other techniques may also be used to compute the interface identifier.

Additionally, the controller 32 encrypts the IPv6 addresses of the short-range interface at MT1 (i.e., MT1(A)) (box 78-5) and of the LTE interface of MT2 (i.e., MT2(W)) (box 78-6). Finally, the controller 32 at MT1 generates a 64-bit nonce N2 and a corresponding nonce index NI2 (box 78-7). Together, the parameters carried in the NPMR message enable MT2 to identify the NPMR message as well as MT1, and take the necessary steps to process the NPMR message upon receipt of the NPMR message.

It may be assumed that, at this point, MT1 and MT2 have established a "pairing," which allows them to advantageously use the security associations (SAs) defined by the Internet Protocol Security (IPSEC) protocol. Particularly, MT1 can encrypt and authenticate the NPMR message using keys and/or other information derived from the IPSEC SAs, thereby further bolstering security against any possible malicious attacks.

Figure 8:
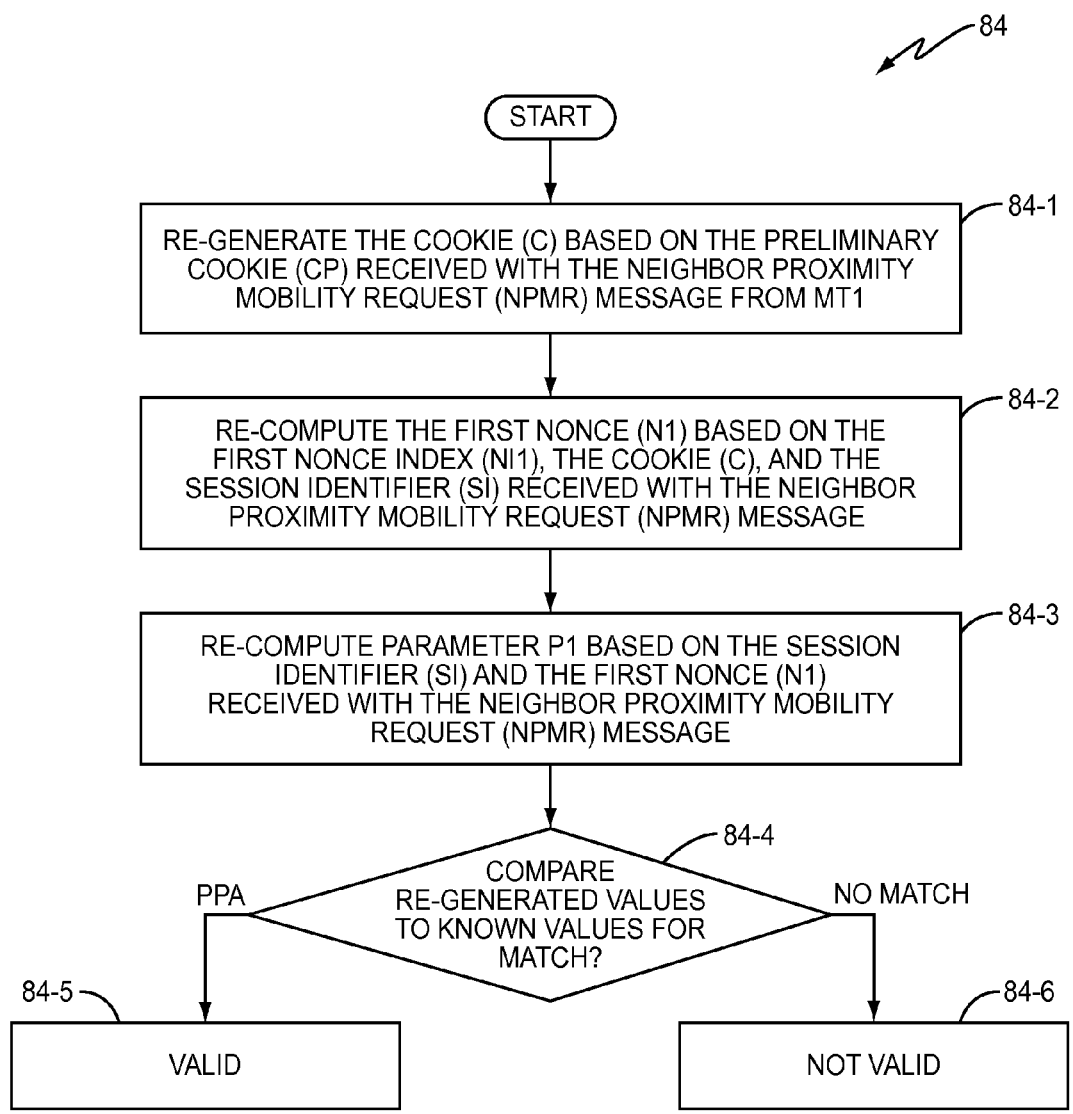
FIG. 8 is a flow chart illustrating a method for validating a received message at a wireless communication device according to one embodiment of the present invention.

Upon receiving the NPMR message, MT2 validates the message and creates a binding cache entry for MT1 (box 84). In one embodiment, seen in FIG. 8, MT2 uses the link layer identifier (and/or the parameters that arrived with the NPMR message) to validate the NPMR message. Particularly, MT2 first checks to determine if the NPMR message is authentic and then re-generates the Cookie (C) by hashing the CP parameter received with the NPMR message (box 84-1). MT2 then re-computes the first nonce N1 using NI1, C, and the SI received with the NPMR message (box 84-2). MT2 then re-computes the P1 parameter based on the SI and the First Nonce received with the NPMR message (box 84-3). Then, MT2 can compare the re-computed and regenerated values to known values received from MT1 (box 84-4). The NPMR message is considered valid (box 84-5) if the values match. Otherwise, MT2 could consider the received NPMR message not valid (box 84-6).

If the NPMR message received from MT1 is considered valid, MT2 decrypts the NPMR message (box 86), validates the 64-bit unique Interface Identifier (IID) for the ad-hoc interface of MT1 (i.e., MT1(A)) (box 88), and creates the binding cache entries between the IPv6 addresses for the MT1(W) interface and MT1(A) interface, as well as between the MT1(L) and MT2(L) interfaces, a shared secret key (Ka) generated at MT2, and a predetermined lifetime value (box 90). The shared secret key Ka may be generated based on any values desired; however in one embodiment, the value for Ka is computed as, $$Ka=First[128,Hash(N1|N2)].$$

where N1 and N2 are the first and second nonces, respectively. The controller 32 takes the first 128 bits from the hash of these two nonces and assigns them as Ka.

Once the binding cache entry has been created, MT2 generates a Neighbor Proximity Mobility Acknowledge (NPMA) message (box 92) and transmits the NPMA message to MT1 (box 94). The NPMA message includes the SI parameter and the same IPv6 addresses received with the NPMR message. The NPMA message also includes the encrypted IP address for the ad-hoc interface for MT2 (i.e., MT2(A)), as well as the nonce index NI2, the selection of flows, and the IPv6 address for the LTE interface of MT2 (i.e., MT2(L)), and is authenticated. MT2 then switches to its short-range interface for communications with MT1.

As seen in FIG. 3C, MT1 creates a binding cache entry for MT2 upon receiving the NPMA (box 96). Particularly, controller 32 at MT1 binds the IPv6 address for the WLAN and ad-hoc interfaces for MT2 (i.e., MT2(W) and MT2(A)), as well as the SI, the secret key Ka generated by MT2, and the Lifetime value. MT1 then switches to its ad-hoc interface so that it can communicate with MT2 over the ad-hoc short-range communication link (box 98).

MT1 and MT2 can continue communications over the ad-hoc link for as long as desired. However, MT1 and MT2 may, at some point, need to switch their communication session back to an infrastructure-based network, such as the WLAN network 14. The need to switch back may be caused, for example, by a degrading or failed short-range communications link. Further, such a failure or degradation may occur very quickly and leave little or no time for the MT1, MT2 to react to the link failure. Additionally, several events can occur that could make such a switch problematic. For example, during communications, one or both of the mobile terminals MT1, MT2 may have switched off their WLAN interface or re-configured that interface with a different IPv6 address. Therefore, MT1 and MT2 may not be able to switch back to that interface.

Consequently, the only stable communications link is the link between the pair of IPv6 addresses configured for the LTE interfaces of MT1 and MT2. Therefore, in the event that MT1 and/or MT2 detect a failure on the ad-hoc short-range communications link (box 100), MT1 and MT2 will fallback to the LTE network-based infrastructure (box 102). That fallback will occur quickly and without the need for generating or sending additional mobility signaling messages. Once MT1 and MT2 have returned to communicating over their respective LTE interfaces (line 104), they can negotiate another communications link using, for example, the SHIM6 protocol. The SHIM6 protocol is described in the reference authored by E. Nordmark and M. Bagnulo entitled, "SHIM6: Level 3 Multihoming SHIM Protocol for IPv6." That reference, which was published in June 2009, is incorporated herein by reference in its entirety. In such cases, all subsequent signaling messages should be authenticated using the secret key Ka.

The present invention may, of course, be carried out in other ways than those specifically set forth herein without departing from essential characteristics of the invention. For example, the specification and drawings discuss embodiments of the present invention in terms of mobile terminals labeled MT1 and MT2. However, this is for illustrative purposes only as the present invention is not so limited. In one or more embodiments, MT1 or MT2 may comprise another communication device including, but not limited to, a node in the device's social ecosystem such as a computing device. Therefore, the present embodiments are to be considered in all respects as illustrative and not restrictive, and all changes coming within the meaning and equivalency range of the appended claims are intended to be embraced therein.

What is claimed is:

1. A method performed by a wireless communications device for switching between a plurality of communication interfaces, the method comprising the steps of:

activating a Long Term Evolution (LTE) interface;

communicating with a remote device via a first wireless communication interface associated with a first wireless communications network, thereby establishing a communication session with the remote device via the first wireless communications network;

detecting a proximity of the remote device;

generating a signaling request message to include one or more security parameters authenticating the wireless communication device to the remote device responsive to detecting the proximity of the remote device, the message comprising a request to establish an ad-hoc peer-to-peer communication link with the wireless communication device;

transmitting the signaling request message to the remote device via the LTE interface;

establishing the ad-hoc peer-to-peer communication link with the remote device responsive to receiving a signaling accept message from the remote device via the first wireless interface;

maintaining the LTE interface in active state regardless of the status of the ad-hoc peer-to-peer communication link, wherein the LTE interface is maintained in the active state through a binding cache entry that binds an address of the LTE interface at the remote device, an address of the LTE interface at the wireless communication device, and a shared secret key $K_a$;

transferring the first wireless network-based communication session to the ad-hoc communication link and continuing the communication session on the ad-hoc link;

detecting a failure of the ad-hoc peer-to-peer communication link;

reestablishing a network-based communications link with the remote device via the LTE interface based on the binding cache entry that binds the address of the LTE interface at the wireless communication device, the address of the LTE interface at the remote device, and the shared secret key $K_a$; and switching the communication session from the failed ad-hoc communication link to the LTE interface-based communications link.

2. The method of claim 1 wherein generating a signaling request message to include one or more security parameters comprises the step of calculating the one or more security parameters at the wireless communication device.

3. The method of claim 2 wherein calculating the one or more security parameters at the wireless communication device comprises the steps of:
calculating a session identifier (SI) based on one or more IP addresses associated with one or more of the wireless interfaces on the wireless communications device and the remote device;
calculating a cookie (C) based on the session identifier and a secret key ($K_S$); and
calculating a preliminary cookie (CP) based on the cookie (C).

4. The method of claim 2 further comprising the step of validating the signaling accept message received from the remote device based on at least one of the security parameters calculated at the wireless communication device.

5. The method of claim 3 further comprising the steps of:
generating a plurality of parameters at the wireless communication device to be used by the remote device to create and store a binding cache entry;
generating a mobility request message including the plurality of parameters to determine an address for a short-range interface at the remote device; and
transmitting the mobility request message to the remote device via the LTE interface.

6. The method of claim 5 wherein generating the plurality of parameters comprises the steps of:
calculating a first parameter (P1) based on the session identifier (SI) and a first nonce (N1) received from the remote device in the signaling accept message;
assigning a first nonce index (NI1) received from the remote device in the signaling accept message to a second parameter (P2);
assigning the preliminary cookie (CP) generated at the wireless communication device to a third parameter (P3);
calculating an interface identifier for an address of a short-range interface at the wireless communication device;
encrypting the address for a short-range interface at the wireless communication device;
encrypting an address for the LTE interface at the remote device;
generating a second nonce (N2); and
generating a second nonce index (NI2).

7. The method of claim 5 further comprising the steps of:
receiving a mobility acknowledgement message from the remote device via the first wireless interface;
creating a binding cache entry that binds:
an address of the first wireless interface at the remote device;
an address of the short-range interface at the remote device;
the session identifier (SI); and
a lifetime value; and
switching to the ad-hoc peer-to-peer communication link to communicate with the remote device.

8. The method of claim 1 further comprising the step of continuing communications with the remote device via the first wireless interface responsive to receiving a signaling deny message from the remote device via the first wireless interface.

9. The method of claim 1 further comprising the step of communicating data packets with the remote device over the ad-hoc peer-to-peer communication link, each data packet including a session identifier calculated at the wireless communication device.

10. A wireless communications device configured to communicate with a remote device over one or more communication interfaces, the device comprising:
one or more cellular transceivers configured to communicate with a remote device via a first wireless interface associated with a first wireless communications network so as to establish a communication session with the remote device via the first wireless network, and also via a Long Term Evolution (LTE) interface associated with an LTE network;
a short-range transceiver configured to detect a proximity of the remote device; and
a controller configured to:
activate the LTE interface;
generate a signaling request message to include one or more security parameters authenticating the wireless communication device to the remote device responsive to detecting the proximity of the remote device, the message comprising a request to establish an ad-hoc peer-to-peer communication link with the wireless communication device;
transmit the signaling request message to the remote device via the LTE interface;
establish the ad-hoc peer-to-peer communication link with the remote device responsive to receiving a signaling accept message from the remote device via the first wireless interface;
maintain the LTE interface in active state regardless of the status of the ad-hoc peer-to-peer communication link, wherein the LTE interface is maintained in the active state through a binding cache entry that binds an address of the LTE interface at the remote device, an address of the LTE interface at the wireless communication device, and a shared secret key $K_a$;
transfer the first wireless network-based communication session to the ad-hoc communication link and continue the communication session on the ad-hoc link;
detect a failure of the ad-hoc peer-to-peer communication link;
reestablish a network-based communications link with the remote device via the LTE interface based on the binding cache entry that binds the address of the LTE interface at the wireless communication device, the address of the LTE interface at the remote device, and the shared secret key $K_a$; and
switch the communication session from the failed ad-hoc communication link to the LTE interface-based communications link.

11. The device of claim 10 wherein the controller is further configured to calculate the one or more security parameters.

12. The device of claim 10 wherein the signaling request message comprises a Path Probe Request message, and wherein the one or more security parameters comprise:
a session identifier (SI) calculated based on one or more IP addresses associated with one or more communication interfaces on the wireless communications device and the remote device;
a preliminary cookie (CP) calculated based on the session identifier and a secret key ($K_S$); and
a cookie (C) calculated based on the preliminary cookie (CP).

13. The device of claim 11 wherein the controller is further configured to validate the signaling accept message received from the remote device based on at least one of the calculated security parameters.

14. The device of claim 11 wherein the controller is further configured to:
generate a plurality of parameters to be used by the remote device to create and store a binding cache entry;
generate a Neighbor Presence Mobility Request (NPMR) message including the plurality of parameters to determine an address for a short-range interface at the remote device; and
transmit the mobility request message to the remote device via the LTE interface.

15. The device of claim 14 wherein the plurality of parameters comprises:
a first parameter (P1) calculated based on the session identifier (SI) and a first nonce (N1) received from the remote device in the signaling accept message;
a second parameter (P2) comprising a first nonce index (NI1) received from the remote device in the signaling accept message;
a third parameter (P3) comprising the preliminary cookie (CP);
an encrypted address of a short-range interface associated with the short-range transceiver, the address including an interface identifier;
an encrypted address of the LTE interface at the remote device;
a second nonce (N2); and
a second nonce index (NI2).

16. The device of claim 14 wherein the controller is further configured to:
receive a mobility acknowledgement message from the remote device via the first wireless interface;
create a binding cache entry that binds:
an address of the first wireless interface at the remote device;
an address of the short-range interface at the remote device;
the session identifier (SI); and
a lifetime value; and
switch to the ad-hoc peer-to-peer communication link to communicate with the remote device.

17. The device of claim 10 wherein the controller is further configured to communicate data packets with the remote device over the ad-hoc peer-to-peer communication link, each data packet including a session identifier calculated at the wireless communication device.

18. The device of claim 10 wherein the first wireless interface comprises one of a Wireless Local Area Network (WLAN) interface and a Digital Subscriber Line (DSL) interface.

19. A method performed by a wireless communications device for switching between a plurality of communication interfaces, the method comprising the steps of:
activating a Long Term Evolution (LTE) interface associated with an LTE communications network;
communicating with a remote device via a first wireless interface associated with a first wireless communications network, thereby establishing a communication session with the remote device via the first wireless network;
validating a signaling request message received from the remote device via a combination of the first wireless interface and the LTE interface, the message comprising a request to establish an ad-hoc peer-to-peer communication link with the remote device;
generating a signaling response message to include one or more security parameters authenticating the wireless communication device to the remote device, the signaling response message comprising one of a signaling accept message to establish the ad-hoc short-range communication link with the remote device, and a signaling deny message to block the remote device from establishing the ad-hoc short-range communication link;
transmitting the signaling response message to the remote device via the LTE interface associated with the LTE communications network;
maintaining the LTE interface in active state regardless of the status of the ad-hoc short-range communication link, wherein the LTE interface is maintained in the active state through a binding cache entry that binds an address of the LTE interface at the remote device, an address of the LTE interface at the wireless communication device, and a shared secret key $K_a$;
upon transmitting the signaling accept message, transferring the first wireless network-based communication session to the ad-hoc communication link and continuing the communication session on the ad-hoc link;
upon detecting failure of the ad-hoc communication link, reestablishing a network-based communications link with the remote device via the LTE interface based on the binding cache entry that binds the address of the LTE interface at the wireless communication device, the address of the LTE interface at the remote device, and the shared secret key $K_a$; and
switching the communication session from the failed ad-hoc communication link to the LTE interface-based communications link.

20. The method of claim 19 wherein generating the signaling deny message comprises the step of generating a Path Probe Denial (PPD) message that includes:
a session identifier (SI) received with the signaling request message;
a cookie (C) received with the signaling request message; and
a Proof of Response (PR) parameter calculated at the wireless communication device based on IP addresses of corresponding source and destination ports at both the wireless communication device and the remote device.

21. The method of claim 19 wherein generating the signaling accept message comprises the step of generating a Path Probe Accept (PPA) message that includes:
a session identifier (SI) received with the signaling request message;
a cookie (C) received with the signaling request message;
a first nonce (N1) generated at the wireless communication device based at least in part on the cookie (C); and
a first nonce index (NI1) generated at the wireless communication device.

22. The method of claim 21 further comprising the steps of:
receiving a mobility request message from the remote device via the first wireless interface, the mobility request message including a parameter (P1), a first nonce index (NI1), and a preliminary cookie (CP); and
validating the mobility request message by:
re-generating the cookie (C) based on the preliminary cookie (CP);
re-computing the first nonce (N1) based on the first nonce index (NI1) received from the remote device, the cookie (C), and the session identifier (SI);

re-computing the parameter (P1) based on the session identifier (SI) and the first nonce (N1); and validating the mobility request message if the re-computed values match known values.

23. The method of claim 22 further comprising the steps of:

decrypting the mobility request message;

validating an interface identifier of an IP address of a short-range interface at the remote device; and creating a binding cache entry that binds:
- an address of the first wireless interface at the remote device;
- the address of the short-range interface at the remote device;
- the address of the LTE interface at the remote device;
- the address of the LTE interface at the wireless communication device; and
- a lifetime value.

24. The method of claim 23 further comprising the steps of:

generating a Neighbor Presence Mobility Acknowledge (NPMA) message to include:
- an encrypted IP address of the short-range interface at the wireless communication device;
- a second nonce index (NI2);
- the address of the LTE interface at the wireless communication device; and
- the session indicator (SI);

transmitting the NPMA message to the remote device via the LTE interface to identify the IP address of a short-range interface at the wireless communication device; and switching to the short-range wireless interface to communicate with the remote device over the ad-hoc short-range communications link.

25. A wireless communications device configured to communicate with a remote device over one or more communication interfaces, the device comprising:

one or more cellular transceivers configured to communicate with the remote device via a first wireless interface associated with a first wireless communications network so as to establish a communication session with the remote device via the first wireless interface, and also via a Long Term Evolution (LTE) interface associated with an LTE network;

a short-range transceiver configured to detect a proximity of the remote device; and a controller configured to:
- activate the LTE interface associated with the LTE network;
- validate a signaling request message received from the remote device via a combination of the first wireless interface and the LTE interface, the message comprising a request to establish an ad-hoc peer-to-peer communication link with the remote device;
- generate a signaling response message to include one or more security parameters authenticating the wireless communication device to the remote device, the signaling response message comprising one of a signaling accept message to establish the ad-hoc short-range communication link with the remote device, and a signaling deny message to block the remote device from establishing the ad-hoc short-range communication link;
- transmit the signaling response message to the remote device via the LTE interface associated with the LTE network;
- maintain the LTE interface in active state regardless of the status of the ad-hoc short-range communication link, wherein the LTE interface is maintained in the active state through a binding cache entry that binds an address of the LTE interface at the remote device, an address of the LTE interface at the wireless communication device, and a shared secret key $K_a$;
- upon transmitting the signaling accept message, transfer the first wireless network-based communication session to the ad-hoc communication link and continue the communication session on the ad-hoc link;
- upon detecting failure of the ad-hoc communication link, reestablish a network-based communications link with the remote device via the LTE interface based on the binding cache entry that binds an address of the LTE interface at the wireless communication device, the address of the LTE interface at the remote device, and the shared secret key $K_a$; and
- switch the communication session from the failed ad-hoc communication link to the LTE interface-based communications link.

26. The device of claim 25 wherein the signaling deny message comprises a Path Probe Denial (PPD) message including one or more of:
- a session identifier (SI) received with the signaling request message;
- a cookie (C) received with the signaling request message; and
- a Proof of Response (PR) parameter calculated at the wireless communication device based on IP addresses of corresponding source and destination ports at both the wireless communication device and the remote device.

27. The device of claim 25 wherein the signaling accept message comprises a Path Probe Accept (PPA) message including one or more of:
- a session identifier (SI) received with the signaling request message;
- a cookie (C) received with the signaling request message;
- a first nonce (N1) generated at the wireless communication device based at least in part on the cookie (C); and
- a first nonce index (NI1) generated at the wireless communication device.

28. The device of claim 27 wherein the controller is further configured to:

receive a mobility request message from the remote device via the first wireless interface, the mobility request message including a parameter (P1), a first nonce index (NI1), and a preliminary cookie (CP); and validate the mobility request message by:
- re-generating the cookie (C) based on the preliminary cookie (CP);
- re-computing the first nonce (N1) based on the first nonce index (NI1) received from the remote device, the cookie (C), and the session identifier (SI); and
- re-computing the parameter (P1) based on the session identifier (SI) and the first nonce (N1); and
- validating the mobility request message if the re-computed values match known values.

29. The device of claim 28 wherein the controller is further configured to:

decrypt the mobility request message;

validate an interface identifier of an IP address of a short-range interface at the remote device; and create a binding cache entry that binds:
- an address of the first wireless interface at the remote device;
- the address of the short-range interface at the remote device;
- the address of the LTE interface at the remote device;

the address of the LTE interface at the wireless communication device; and a lifetime value.

30. The device of claim 29 wherein the controller is further configured to:

generate a Neighbor Presence Mobility Acknowledge (NPMA) message to include:

an encrypted IP address of the short-range interface at the wireless communication device;

a second nonce index (NI2) received with the mobility request message;

the address of the LTE interface at the wireless communication device; and the session indicator (SI);

transmit the NPMA message to the remote device via the LTE interface to identify the IP address of the short-range interface at the wireless communication device; and switch to the short-range wireless interface to communicate with the remote device over the ad-hoc short-range communications link.

* * * * *

UNITED STATES PATENT AND TRADEMARK OFFICE
CERTIFICATE OF CORRECTION

PATENT NO. : 8,385,269 B2  
APPLICATION NO. : 12/765963  
DATED : February 26, 2013  
INVENTOR(S) : Haddad Page 1 of 1

It is certified that error appears in the above-identified patent and that said Letters Patent is hereby corrected as shown below:

In the Specifications:

In Column 4, Line 58, delete "an" and insert -- a --, therefor.

In Column 8, Line 26, delete "(Ks)," and insert -- $(K_s)$, --, therefor.

In Column 8, Line 41, delete "Ks)]." and insert -- $K_s$)]. --, therefor.

In the Claims:

In Column 13, Line 16, delete "$(K_S)$;" and insert -- $(K_s)$; --, therefor.

In Column 14, Line 65, delete "$(K_S)$;" and insert -- $(K_s)$; --, therefor.

Signed and Sealed this  
Fourth Day of June, 2013

Teresa Stanek Rea  
*Acting Director of the United States Patent and Trademark Office*